Sept. 15, 1931. G. A. TOAZ 1,823,009
METHOD OF FORMING VALVE STEM COLLARS
Filed Oct. 11, 1929
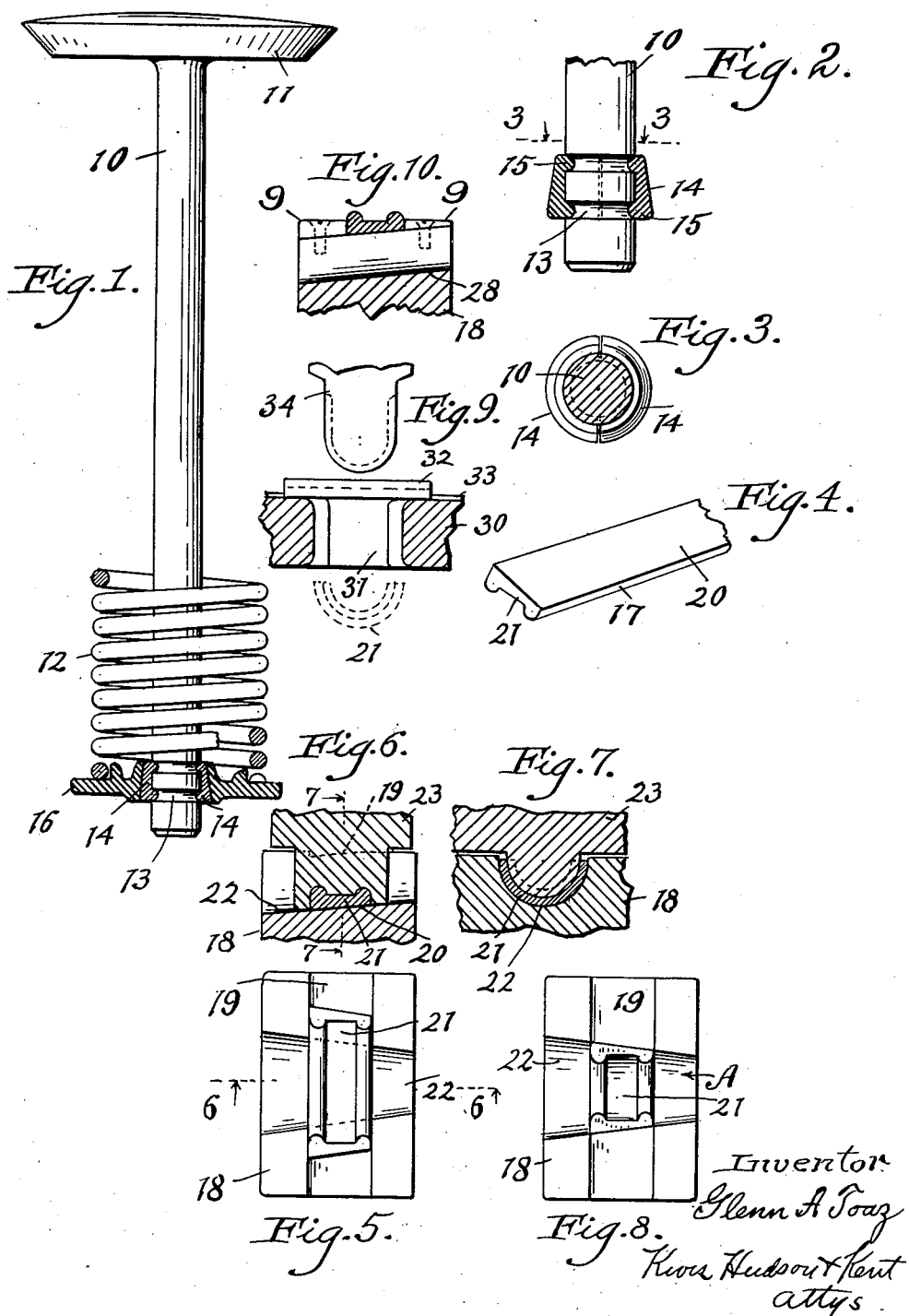

Patented Sept. 15, 1931

1,823,009

UNITED STATES PATENT OFFICE

GLENN A. TOAZ, OF CLEVELAND, OHIO

METHOD OF FORMING VALVE STEM COLLARS

Application filed October 11, 1929. Serial No. 399,018.

This invention relates to a method of forming valve stem collars.

Valve stem collars, as used upon high grade internal combustion engines, are generally made in two parts of substantially semi-cylindrical shape, with one or more internal beads which fit into corresponding grooves formed in the valve stem. These collars have been turned out of cylindrical stock, and then sawed in two. Because of the fact that the collars are of small diameter, the internal turning operation necessary to form the beads has been a difficult and expensive one. The sawing operation furthermore leaves burrs which must be removed by hand filing or other means. Consequently the industry has resorted generally to other and inferior types of collars for use upon the lower and intermediate grade of engines.

It is the object of my invention to provide a method for the manufacture of the most approved form of collar at a cost which shall compete with the cost of the inferior class of collars.

Other objects will appear as I proceed with the description of those forms of the invention which, for the purposes of the present application, I have illustrated in the accompanying drawings, in which Figure 1 is an elevational view, partly in vertical section, of a valve carrying a valve stem collar as produced by the present method, and showing a valve spring and spring retainer assembled thereupon.

Fig. 2 is a view on a larger scale corresponding to a portion of the lower end of Fig. 1.

Fig. 3 is a cross sectional view taken substantially on the line 3—3 of Fig. 2.

Fig. 4 is a perspective view of a fragment of a drawn or rolled or extruded strip, representing the result of the first step of my method.

Fig. 5 is a plan view showing a portion of such strip cut to length and lying upon the surface of an outer or lower die member which may be employed in connection with the last step of the method.

Fig. 6 is a vertical sectional view corresponding to the line 6—6 of Fig. 5, but showing the inner and outer die members at the completion of the pressing operation.

Fig. 7 is a cross section taken substantially on the line 7—7 of Fig. 6.

Fig. 8 is a view similar to Fig. 5, showing the collar half in its finished form after the inner die member has been withdrawn.

Fig. 9 is an elevational view illustrating an alternative method of forming the stock into cylindrical shape, and Fig. 10 is a transverse section of a slightly modified form of lower die member with an unformed strip in place thereon.

Referring to Figs. 1 and 2 of the drawings, 10 represents the stem of a valve 11, and 12 is the valve seating spring. Near the lower end of the stem there are formed two peripheral grooves 13. The number of grooves employed may be varied as desired. One may be sufficient in some cases and more than two may be desirable in others. Surrounding the stem at its lower end is a collar made in two halves 14, in order to permit assembly. These collar halves are formed with internal beads 15 shaped and spaced to take into the grooves 14. Whatever internal wall space there may be between the beads is cylindrical in contour and adapted for contact with the cylindrical wall of the stem 10.

The outer wall of the collar must be shaped to form a support for a spring retainer 16, and this is conveniently accomplished by making the surface slightly conical to fit a similarly conical hole in the retainer 16.

The above description will serve to indicate the use of the article which results from the present invention. The first step of my method consists in forming a long strip of metal, indicated at 17 in Fig. 4, of a cross section corresponding to the desired cross section of the finished article. This strip may be produced by rolling, drawing, extruding or any other known or desirable method. The strip is then cut into lengths corresponding to a little less than half the circumference of the collar, it being permissible to leave a small space between adjacent ends of the collar halves when they are assembled on the valve stem as shown in Fig. 3. The cuts may be beveled outwardly from the inner face of the strip to the outer face, resulting in a diagonal edge for each end of the outer face of the strip, as shown in the same figure. However it is not essential that the meeting faces of the collar pieces be parallel, and hence straight cuts may be employed.

The length of material is then placed upon the lower or outer die member 18 in a groove 19, the bottom surface of which may have an inclination corresponding to the taper of the lower side 20 of the stock, so that when the strip is in place in the groove the upper face 21 thereof is horizontal. As an alternative to the use of a groove 19 I may make the entire upper surface of the lower die member with an inclination corresponding to the inclination of the lower surface of the strip 17, and mount spacers 9 upon the top surface of die 18 in order to properly position the strip. One or both of these spacers may be adjustable, if desired, to accommodate strips of different width, or to bring into use a different portion of the die. The die 18 is formed with a tapered socket 22 running transversely of the groove 19 and having dimensions, in that portion which is in line with the groove, substantially equal to the desired exterior dimensions of the collar half. When the length of stock is properly positioned in the groove 19 centrally of the socket 22, an inner or upper die member 23, shaped on its lower rounded surface to conform with the surface 21, the beads 15 and the edge walls of the stock, is caused to descend and to press the length of stock into a generally cylindrical form, as indicated in Figs. 6 and 7. The die member 23 is then raised and the finished article is knocked out of the die 18 by pressure applied in the direction of the arrow A in Fig. 8.

As an alternative to the two latter steps of the method, I may cut the stock to length with straight ends, and punch it into semi-cylindrical form by means of apparatus illustrated in Fig. 9, where 30 represents a die member having an opening 31 therethrough with vertical walls tapered horizontally to conform with the taper of the outer wall of the finished article. 32 represents the work in place in a groove 33 similar to the groove 19 above referred to. 34 is a punch having a lower end surface complemental to the internal surface of the finished article. 35 represents a formed collar piece dropping from the press. Its upper edges do not lie in a single plane, but they may be finished to such a plane surface if that is regarded as necessary by a grinding or machining operation. A further coin press operation for the exact sizing of the collar halves formed in this manner may be desirable.

While in the foregoing description and accompanying drawings I have disclosed more or less in detail certain specific steps of the invention, I desire it to be understood that such detail disclosure is primarily for the purpose of fully illustrating the invention, and is not to be construed as amounting to a limitation upon the scope thereof.

Having thus described my invention I claim:

1. A method of forming valve stem collars, which consists in forming a metal strip with non-parallel sides to the desired cross section of the collar including a bead on one side of the strip running lengthwise thereof, cutting said strip into lengths corresponding substantially to the peripheral dimensions of collar pieces, and curving said lengths into a generally semi-cylindrical form.

2. A method of manufacturing valve stem collars, which consists in forming a metal strip with non-parallel sides to the desired cross section of the collar including a bead on one side of the strip running lengthwise thereof, cutting said strip into lengths corresponding substantially to the peripheral dimension of a collar half, and pressing said halves between dies into a generally semi-cylindrical shape.

3. A method of manufacturing valve stem collars having non-parallel sides, which consists in forming a metal strip to the desired cross section of the collar, cutting said strip into lengths having diagonal ends converging toward the thinner edge of the strip, and curving said lengths into a form such that the inner side has a cylindrical wall and that the ends are parallel to the axis of the cylinder.

4. A method of manufacturing valve stem collars having non-parallel sides, which consists in forming a metal strip to the desired cross section of the collar, cutting said strip into lengths having diagonal and beveled ends, the diagonal lines converging toward the thinner edge of the strip, and pressing said lengths between dies, the inner die having a cylindrical shape and the outer die having a cooperating conical socket, whereby the collar is provided with a cylindrical inner wall and with ends lying in substantially the same plane.

5. A method of forming valve stem collars having beads on their inner surfaces adapted to take into peripheral grooves on the valve stem, which consists in forming a continuous strip of metal having non-parallel sides and beads on one side thereof, cutting said strip into lengths substantially equal to half the circumference of the stem, and forming said lengths into collar halves with the beads on the inner sides thereof.

6. A method of manufacturing valve stem collars having non-parallel sides, which consists in forming a metal strip to the desired cross-section of the collar, the sides being inclined toward one edge, and one side having a longitudinal bead thereupon cutting said strip into lengths slightly less than the semicircumference of the stem, and curving said lengths into a form such that the inner side carrying the bead has a cylindrical wall correpsonding in curvature to that of the stem.

In testimony whereof, I hereunto affix my signature.

GLENN A. TOAZ.